United States Patent Office 2,729,685
Patented Jan. 3, 1956

2,729,685

PRODUCTION OF HIGH PURITY 1,2,4,5-TETRA-CHLOROBENZENE

Paul E. Weimer, Baton Rouge, La., and Aubrey L. Hanna, Pensacola, Fla., assignors to Ethyl Corporation, New York, N. Y., a corporation of Delaware No Drawing. Application September 17, 1952,
Serial No. 310,111

3 Claims. (Cl. 260—650)

This invention relates to manufacture of 1,2,4,5-tetrachlorobenzene and more particularly to a new and improved method for obtaining 1,2,4,5-tetrachlorobenzene in an extremely high degree of purity.

1,2,4,5-tetrachlorobenzene is a chemical of great utility in the process industry, particularly as an intermediate in the production of 2,4,5-trichlorophenoxyacetic acid (2,4,5-T). The usual processes for conversion of 1,2,4,5-tetrachlorobenzene to 2,4,5-T comprise the steps of hydrolyzing 1,2,4,5-tetrachlorobenzene, usually with an alkali hydrolysis agent in the presence of a lower aliphatic alcohol such as methanol or ethanol, thereby producing 2,4,5-trichlorophenol, which is in turn condensed with chloroacetic acid to form 2,4,5-T. If the 1,2,4,5-tetrachlorobenzene is contaminated with other chlorinated benzenes, phenols other than 2,4,5-trichlorophenol will be formed in the hydrolysis step. Separation of these from 2,4,5-trichlorophenol is especially difficult, and if they are permitted to remain with the 2,4,5-trichlorophenol during the condensation reaction, this leads to the formation of phenoxyacetic acids other than the desired 2,4,5-T.

Normal methods for preparation such as chlorination of trichlorobenzenes at temperatures of 60° C. or more and in the presence of a chlorination catalyst, followed by crystallization of 1,2,4,5-tetrachlorobenzene usually lead to a product of purity in the range of 90–95 per cent. This is suitable for many uses, but for preparation of 2,4,5-T the 1,2,4,5-tetrachlorobenzene should be preferably of at least 97 per cent, most preferably 99 per cent purity. Heretofore, the only means of producing 1,2,4,5-tetrachlorobenzene of this purity has been recrystalization, which is time consuming and results in high losses of material.

An object of this invention is to provide a new and improved means for obtaining 1,2,4,5-tetrachlorobenzene in extremely high purity. Another object of the invention is to provide a new and improved method for obtaining 1,2,4,5-tetrachlorobenzene in extremely high purity without the need for a recrystallization step.

These and other objects of the invention are accomplished by washing 1,2,4,5-tetrachlorobenzene of a purity of 90–95 per cent (corresponding to the material isolated from chlorination processes) with a lower aliphatic monohydric alcohol such as methanol, ethanol, propanol, isopropanol, butanols, amyl alcohols, and the like. Preferably lower aliphatic alcohols of not more than 2 carbon atoms; that is, methanol or ethanol, are used, chiefly for reasons of economy.

In the practice of our invention 1,2,4,5-tetrachlorobenzene of 90–95 per cent purity is washed at temperatures ranging from 0–50° C. with methanol or ethanol or other lower aliphatic alcohols and the wash liquid then separated from the 1,2,4,5-tetrachlorobenzene by customary means such as filtration or centrifugation. This leads to material having a purity of about 97 per cent, including the wash liquid retained in the 1,2,4,5-tetrachlorobenzene and having a purity of 98–99 per cent on a wash-free basis.

The weight ratio of lower aliphatic alcohol to crude 1,2,4,5-tetrachlorobenzene treated ranges from 0.07 to 1 to 0.55 to 1. Normal means of washing such a slurrying with or without agitation, applying wash liquid during filtration or centrifugation operation, etc., may be used.

Among the desirable attributes of a wash liquid are the following:

1. Wash liquid should be such that minimum amounts are retained on the washed material after separation.
2. It should be capable of giving a washed material of a high degree of purity.
3. The wash liquid should remove a relatively large amount of impurity per unit amount of wash liquid used.
4. The wash liquid should remove a minimum amount of desired product.
5. A minimum amount of wash liquid should be required per unit amount of material to be washed.

We have found that the wash liquids of our invention possess these attributes to a marked degree. It would be expected that materials similar in chemical nature to 1,2,4,5-tetrachlorobenzene would be the most desirable wash materials. Materials such as mono- and trichlorobenzenes, for example, are good solvents for all the impurities which are normally associated with 1,2,4,5-tetrachlorobenzene crystals and therefore would be expected to be ideal wash materials. We have found, surprisingly, that this is not the case and that materials of a completely different chemical nature namely, methanol and ethanol, are much more effective wash liquids than materials structurally similar to 1,2,4,5-tetrachlorobenzene, such as trichlorobenzene and monochlorobenzene. This is even more surprising in view of the fact that the impurities associated with the 1,2,4,5-tetrachlorobenzene are essentially insoluble in lower alcohols, as is shown by the separation of the wash solution, after separation from washed 1,2,4,5-tetrachlorobenzene, into two layers. One of these layers is a saturated solution of 1,2,4,5-tetrachlorobenzene and the impurities in the alcohol; the other consists essentially of a mixture of the impurities, and contains small amounts of 1,2,4,5-tetrachlorobenzene.

The benefits of our wash liquids are illustrated in the following table, in which results with methanol are contrasted with those obtained with chlorobenzene and trichlorobenzene as wash liquid.

*Performance of wash liquids in washing crude 1,2,4,5-tetrachlorobenzene*

| Wash Liquid | Liters of Wash Liquid Required per Kilogram of 1,2,4,5-Tetrachlorobenzene | Parts Impurity Removed Per Part Wash Liquid Used | Parts 1,2,4,5-Tetrachlorobenzene Removed Per Part Wash Liquid Used | Purity of Washed Cake, Including Residual Wash Liquid, Percent | Purity of Washed Cake, Wash-Free Basis, Percent |
|---|---|---|---|---|---|
| Methanol | 0.07 | 0.750 | 0.083 | 96.6 | 99.0 |
| Chlorobenzene | 0.10 | 0.658 | 0.183 | 94.7 | 98.9 |
| Trichlorobenzene | 0.12–0.25 | 0.575–0.293 | 0.119 | 92.6 | 97.7 |

The use of methanol easily leads to a cake of 96.6 per cent purity, including wash liquid retained, and this can be easily converted by drying to material of 99 per cent purity on a wash-free basis. At the same time material recoveries in the neighborhood of 97 per cent are achieved. With ethanol the results are similar to those achieved with methanol.

The above results were achieved in a procedure which is typified by the following example.

*Example I*

To a charge of crude 1,2,4,5-tetrachlorobenzene (90–95 per cent pure) arranged on a centrifuge to a depth of approximately one-half inch, is fed methanol at a temperature of 27–30° C., while the centrifuge rotates at a speed of 3700–4400 R. P. M. The methanol wash is continuously removed from the solid cake by centrifugation, and the centrifuge is spun for 15–900 seconds. At the end of this time the purified 1,2,4,5-tetrachlorobenzene of at least 97 per cent purity is removed from the centrifuge. If removal of residual wash liquid is desired, the 1,2,4,5-tetrachlorobenzene can simply be heated to an elevated temperature below its melting point.

The aforementioned separation of the wash solution into an alcohol-rich phase and an impurity-rich phase leads to further benefits in that the alcohol can be separated by simple decantation from the impurities and recycled to further washings. Recycling cuts down still further the amount of 1,2,4,5-tetrachlorobenzene removed with wash liquid as the wash liquid is saturated with 1,2,4,5-tetrachlorobenzene.

We claim:

1. In a process for the production of 1,2,4,5-tetrachlorobenzene of extremely high purity in which lower chlorinated benzenes are chlorinated and thereafter an impure 1,2,4,5-tetrachlorobenzene is crystallized, the novel steps comprising washing the 1,2,4,5-tetrachlorobenzene of less than 95 percent purity at a temperature between about 0° and 50° C. with a lower aliphatic monohydric alcohol and separating wash liquid from residual solids.

2. The process of claim 1 in which the alcohol is methanol.

3. In a process for the production of 1,2,4,5-tetrachlorobenzene of extremely high purity in which lower chlorinated benzenes are chlorinated and thereafter an impure 1,2,4,5-tetrachlorobenzene is crystallized, the novel steps comprising washing the 1,2,4,5- tetrachlorobenzene of less than 95 percent purity at a temperature between about 0° and 50° C. with a lower aliphatic monohydric alcohol, separating wash liquid from residual solids, permitting said wash liquid to settle into an alcohol-rich phase and impurity-rich phase and further separating the alcohol-rich phase of the wash liquid from the impurity-rich phase of the wash liquid.

References Cited in the file of this patent
UNITED STATES PATENTS

| | | |
|---|---|---|
| 1,934,675 | Mills | Nov. 7, 1933 |
| 2,439,237 | Cass | Apr. 6, 1948 |